(No Model.)

W. HESTON.
FRUIT JAR.

No. 586,126. Patented July 13, 1897.

Witnesses

Inventor
William Heston,
by W. H. Fincel
atty.

United States Patent Office.

WILLIAM HESTON, OF HOMESTEAD, PENNSYLVANIA, ASSIGNOR TO THE HOMESTEAD MANUFACTURING COMPANY, LIMITED, OF SAME PLACE.

FRUIT-JAR.

SPECIFICATION forming part of Letters Patent No. 586,126, dated July 13, 1897.

Application filed October 24, 1896. Serial No. 609,995. (No model.)

*To all whom it may concern:*

Be it known that I, WILLIAM HESTON, a citizen of the United States, residing at Homestead, in the county of Allegheny and State of Pennsylvania, have invented a certain new and useful Improvement in Fruit-Jars, of which the following is a full, clear, and exact description.

This invention relates to that class of fruit or preserve jars in which the cover or top is sealed by a valve-like device and a bail or swinging clamp, and the invention is more especially designed to provide such a sealing device as will economize space in packing.

The invention in its most specific form is an improvement upon the jar forming the subject of my Patent No. 377,676, granted February 7, 1888. In that patent the bail and the combined hand-lever and valve fixed thereto stand up above the lid, cover, or top so far as to occasion a loss of space in packing. In the present invention I substitute a bail or swinging clamp of less height and of unbroken curvature and a valve detached therefrom and also having a cast-off for the bail, all as I will proceed now more particularly to set forth and finally claim.

Figure 1:
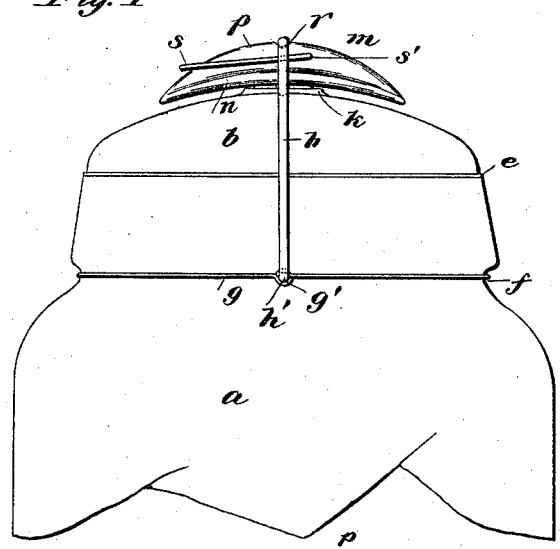
Figure 2:
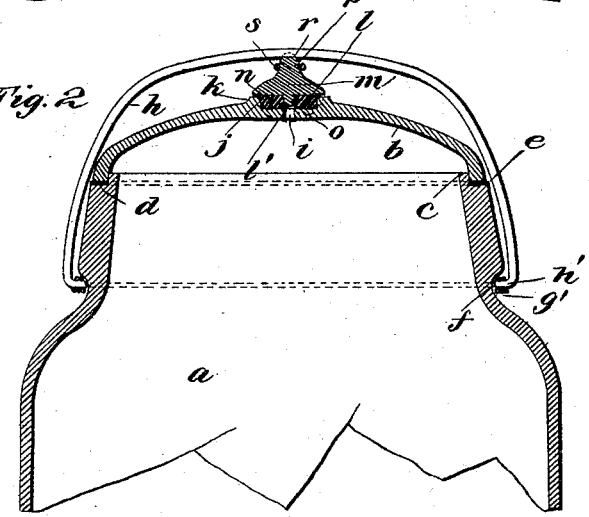
Figure 4:
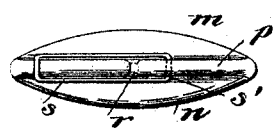
Figure 3:
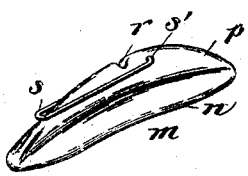
Figure 5:

In the accompanying drawings, illustrating my invention, in the several figures of which like parts are similarly designated, Figure 1 is a side elevation. Fig. 2 is a vertical section taken in a plane at right angles to Fig. 1. Fig. 3 is a perspective view of the valve and cast-off; Fig. 4, a top plan view thereof, and Fig. 5 a side elevation of the same.

The jar $a$ may be of any approved construction, but as I prefer to use a cover or top $b$ in all respects substantially similar to that shown and described in the patent referred to I use a jar having a mouth-flange $c$ and an adjacent external shoulder $d$, on which latter is placed a flat gasket $e$, and below the shoulder is a recess $f$, in which is arranged the wire or band $g$, by means of which the swinging clamp or bail $h$ is secured to the jar. This clamp or bail is made as a continuous or unbroken curve and is capable of being swung up over the cover or top to secure it in place to close the jar. The clamp or bail may be made of wire and provided with the journals $h'$, which engage bearings $g'$ in the device $g$ to unite the two in a pivotal manner, as usual, and so as to permit the aforesaid swinging movement.

The rim of the cover or top fits down over the mouth-flange and upon the gasket. The cover is provided with an opening $i$, and this opens into an external recess $j$ in the cover, and this recess is surrounded by a flange $k$, elevated above the highest plane of the body of the cover. Within the recess is placed a yielding or compressible plug $l$, having a central opening $l'$ in alinement with the opening $i$ in the cover, and this plug is slightly higher than the flange $k$ when not compressed. The plug may be of rubber.

$m$ is the valve, which may be made as a casting, or it may be of other rigid material. This valve has a base-flange $n$, from which depends a teat $o$, which is adapted to enter and partly or wholly close the opening $l'$ of the plug $l$. A longitudinal rib or cam $p$ rises from the back of the flange and at right angles thereto and is curved from end to end in an arc of a circle greater in height than the length of the radius of the arc of movement of the bail, so that the valve will be forcibly pressed down upon the plug and compress it about the teat $o$, and so seal up the openings in the plug and cover. A notch $r$ is made in the rib to receive the bail as it reaches the highest point in its movement, and thereby the bail is held from further movement and is locked with the valve and locks the latter securely in place. It will be seen thus that the bail is out of direct contact with the glass of the jar and its cover and that the plug is interposed between the said valve and cover, and the valve has no contact with the cover or, at most, only with the flange $k$, and hence the liability of cracking the cover by contact of the unequally expanding and contracting metal and glass is obviated or reduced to a minimum.

The valve is provided with a loop $s$, of wire, pivoted at $s'$ to the rib or cam $p$ at one side of the notch $r$ and below it, so that it is normally beneath the bail when the jar is sealed. When the jar is to be opened, the loop $s$ is raised like a lever, and coming against the bail further movement of it will lift the bail out of the notch $r$ and so cast it off, and because of this function I refer to the loop as a "cast-off." The cast-off may be of wire or other material.

By the use of the detached valve and the symmetrical bail I am able to obtain all of the advantages of the invention of the patent referred to and in addition effect a saving of space to the packer. Furthermore, there is an economy in the first cost of production.

What I claim is—

1. A valve for sealing vented fruit or preserve jars, having a teat for coöperation with the vent-plug, and a notched cam for coöperation with the bail, and adapted for use with a compressible vent-plug, substantially as described.

2. A valve for sealing vented fruit or preserve jars, having a teat about which a compressible vent-plug is crowded, a notched cam to be engaged by the bail, and a cast-off for the bail, substantially as described.

3. A fruit or preserve jar, having a swinging bail pivoted to it, a cover having a vent, and a perforated compressible plug arranged in a recess around said vent, combined with a valve having a teat adapted to enter the opening in the plug, a notched cam adapted to receive the bail and thereby compress the plug about the teat to close the vent in the cover, and a cast-off pivoted to the valve beneath the bail, substantially as described.

In testimony whereof I have hereunto set my hand this 22d day of October, A. D. 1896.

WILLIAM HESTON.

Witnesses:
 REID KENNEDY,
 F. J. ERBECK.